(12) United States Patent
Housel et al.

(10) Patent No.: US 7,315,541 B1
(45) Date of Patent: Jan. 1, 2008

(54) METHODS AND APPARATUS FOR ROUTING A CONTENT REQUEST

(75) Inventors: Barron Housel, Chapel Hill, NC (US); Tzu-Ming Tsang, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 992 days.

(21) Appl. No.: 10/115,555

(22) Filed: Apr. 3, 2002

(51) Int. Cl.
*H04L 12/28* (2006.01)
*H04L 12/56* (2006.01)
*G06F 15/177* (2006.01)
*G06F 15/173* (2006.01)

(52) U.S. Cl. .................. 370/392; 370/397; 709/220; 709/223

(58) Field of Classification Search ............... 370/392, 370/389–401, 351, 498, 252, 238, 338, 469, 370/399, 352, 230, 235, 369, 258, 402, 236; 709/245, 217–224, 230, 105, 206, 227–229, 709/238, 244; 711/122, 124; 455/466, 412, 455/445, 427, 452; 379/220.01, 114.02, 379/221
See application file for complete search history.

(56) References Cited

U.S. PATENT DOCUMENTS

| | | | |
|---|---|---|---|
| 5,881,241 A | 3/1999 | Corbin ................ 395/200.68 |
| 5,999,974 A | 12/1999 | Ratcliff et al. ............. 709/224 |
| 6,003,080 A | 12/1999 | Ratcliff et al. ............. 709/224 |
| 6,006,261 A | 12/1999 | Ratcliff et al. ............. 709/224 |
| 6,014,699 A | 1/2000 | Ratcliff et al. ............. 709/224 |
| 6,078,964 A | 6/2000 | Ratcliff et al. ............. 709/300 |
| 6,154,839 A | 11/2000 | Arrow et al. ............. 713/154 |
| 6,181,698 B1 | 1/2001 | Hariguchi ................ 370/392 |
| 6,307,855 B1 | 10/2001 | Hariguchi ................ 370/392 |
| 6,466,971 B1 * | 10/2002 | Humpleman et al. ....... 709/220 |
| 6,523,696 B1 * | 2/2003 | Saito et al. ................. 709/223 |
| 6,542,964 B1 * | 4/2003 | Scharber .................... 711/122 |
| 6,892,245 B1 * | 5/2005 | Crump et al. ............... 709/245 |
| 6,981,029 B1 * | 12/2005 | Menditto et al. ........... 709/217 |
| 2002/0141378 A1 * | 10/2002 | Bays et al. .................. 370/351 |
| 2002/0163920 A1 * | 11/2002 | Walker et al. .............. 370/401 |
| 2003/0086422 A1 * | 5/2003 | Kinker et al. ............... 370/389 |
| 2003/0099237 A1 * | 5/2003 | Mitra et al. ................. 370/393 |
| 2003/0110929 A1 * | 6/2003 | Takeda et al. .............. 709/245 |
| 2003/0142679 A1 * | 7/2003 | Okagawa et al. ........... 370/397 |
| 2003/0182420 A1 * | 9/2003 | Jones et al. ................. 709/224 |
| 2003/0195919 A1 * | 10/2003 | Watanuki et al. ........... 709/105 |
| 2004/0210670 A1 * | 10/2004 | Anerousis et al. .......... 709/238 |

(Continued)

*Primary Examiner*—Wing Chan
*Assistant Examiner*—Prenell Jones
(74) *Attorney, Agent, or Firm*—BainwoodHuang

(57) ABSTRACT

Mechanisms and techniques provide a method for routing a packet that includes a content request and an Internet Protocol address and port number that identify a source transmitting the packet. The method relates to selecting a routing policy to forward the packet, based upon at least a portion of content request. The method includes a data communications device receiving a packet having a content request and an Internet Protocol address and port number that identify a source transmitting the packet. The device performs a network address translation, based upon at least a portion of the content request, to translate the Internet Protocol address and port number of the packet to a respective communications device Internet Protocol address and communications device port number. The device then selects a routing policy based upon the communications device Internet Protocol address and routes the packet to a destination according to the routing policy.

23 Claims, 14 Drawing Sheets

U.S. PATENT DOCUMENTS

2005/0010653 A1* 1/2005 McCanne .................. 709/219
2006/0098577 A1* 5/2006 MeLampy et al. ......... 370/238
2006/0168328 A1* 7/2006 Shimada et al. ............ 709/238

* cited by examiner

METHODS AND APPARATUS FOR ROUTING A CONTENT REQUEST

BACKGROUND OF THE INVENTION

Data communication devices are used to direct or route requests from clients connected to a network to servers located on the same network. FIGS. 1A, 1B and 2 illustrate different types of routing systems 10 for directing requests to a particular server. Each routing system 10 includes a client 12, a data communications device 14 and a server 16.

FIG. 1A illustrates routing of a packet based upon a destination Internet Protocol (IP) address. Such routing is termed L3 routing. As illustrated, the client 28 sends a packet that includes a request for information 18 to a destination address 30. The data communications device 20 forwards the request 30 to a server 32 having an IP address 15 matching the destination IP address 30 within the request 18. In this example, the data communications device 20 can include a router.

FIG. 1B illustrates routing based on a "flow" 5-tuple consisting of the source and destination IP addresses, the source and destination port numbers, and the protocol type. Such routing is termed L4/L5 routing. A wild card 5-tuple can be used to classify the request in order to direct the packet to a particular destination. As illustrated, a first client 34 and a second client 36 send out a first request 38 and a second request 40, respectively. The requests 38, 40 include similar destination addresses and different port numbers. Requests for the same destination IP address are intercepted by the data communications device 22 and directed to different servers 42, 44 based upon the port number 45 in the request. In this example, the data communications device 22 can include a server load balancer.

FIG. 2 illustrates routing of a request based upon a uniform resource locator (URL). Such routing is termed L7 routing. When a request for a domain name 50 is transmitted by a client 46, a DNS (domain name service) request is issued from the client 46 or its local DNS server to resolve the domain name 50 into an IP address of a server 16 that contains information relating to the domain name. If the domain name is subscribed for data communication device or routing services, the IP address of the data communications device 26 is returned to the client 46. Subsequently, the client 46 makes a connection with the data communications device 26 and sends the request to the appropriate server 16. The data communications device 26 intercepts the request 50 and parses the URL (and the HTTP headers) into an application, a domain name, and an object portion.

The domain name "www.cars.com", shown in FIG. 2, identifies two data centers in different parts of the world, a first data center 54 located in San Francisco (SF) and a second data center located in New York (NY). Depending on the location of the clients 46, 50, the DNS can resolve "www.cars.com" to either the SF server 54 or the NY 56 server. However, the objects for cars reside on the SF server 54 while the objects for trucks are located at the NY data center 56. Typically, because of their physical proximity, requests from clients 46, 48 located on west coast would be directed to the SF server 54 even if the request called for truck information. The goal of the data communications device 26 is to learn about the distribution of content so the request can be directed to the server that can deliver the requested content directly and most efficiently. In some cases the request can be directed to a proxy cache or replication server that contains a replica of the object requested.

In this example, assume that a client 48 requests a starting web page from www.cars.com. This page can be retrieved from either of the data centers 54, 56. The data communications device 26, located in Phoenix, issues a DNS request to resolve the domain name into an IP address. Because the data communications device 26 is located closer to the server 54 in SF than the server 56 in NY, the IP address of the server 54 in SF (20.20.20.1) is returned to the data communications device 26. The data communications device 26 then returns the IP address of itself (70.70.80.1) to the client 34 as the DNS response. The client 34 connects to the data communications device 26 and forwards the request. The data communications device 26 connects to the server 54 receives the page for www.cars.com and returns it to the client 48. After the www.cars.com page is displayed, the user triggers an option that sends a GET request for a truck image (/trucks/model2.jpeg) at www.cars.com. Again, the DNS request from the client is intercepted by the data communications device 26 and the IP address of the data communications device 26 is returned to the client 48. Next, the client 48 connects to the data communications device 26 and sends the GET request 52 for www.cars.com/trucks/model2.jpeg. The request 52 is initially routed to the SF server 54 (20.20.1.1) and subsequently redirected to the NY server 56 (10.10.1.2), where the requested information is located. The data communications device 26 can dynamically learn or be configured to know the origin servers for all of the content classes for a request and, thereby, route requests to the correct origin server. In the above example, the data communications device 26 can include a content gateway.

Different traffic policies and differentiated services can be signaled by the data communications device. For example, the data communications device can signal that packets transferred between the communications device and the server receive high priority or that the packets be routed over MPLS or IPSEC tunnels. In one arrangement, such policies are triggered by the data communications device based upon the server to which the communications device routes the request. For example, a server can pay a fee such that a particular communications device or series of communications devices routes all received requests to the server with high priority or with a relatively large bandwidth between the device and the server.

SUMMARY OF THE INVENTION

Data communications devices can be placed at the edge of a network to route the flow of packets, from clients, containing content requests, based upon a portion of the content request itself, to respective servers. The data communications device can forward the requests to the respective servers using a routing policy, as predetermined by the receiving server.

While many data communications devices can route client content requests using routing policies, certain data communications devices do not support policy based routing. For example, a data communications device can consist of many types of processors. Typically, there is one L3 routing processor and many application processors, such as L7 processors (i.e. cache engines and gateways). The routing processor is used to perform policy based routing. The application processors, such as the cache engine and gateway, do not handle routing functions and are, therefore, unable to perform policy based routing.

The present case is directed toward techniques for selecting a routing policy to direct a content request to a server where the policy chosen is based upon at least a portion of the content request. Such techniques associate a portion of a content request with an Internet Protocol address from a particular network address translation (NAT) pool. Each network address pool is, in turn, associated with a particular routing policy. When the request is directed from the data communications device to the server, using the Internet Protocol address chosen from the NAT pool, the request is directed using the associated routing policy.

Determination of a routing policy based upon a portion of a content request allows for content aware processing to be performed in a network by data communications devices that do not support policy based routing. Furthermore, because the chosen routing policy is based upon a portion of the content request, the routing policy used to direct the content request to a server can be independent of the predetermined routing policy chosen by a destination server.

According to one embodiment of the invention, a method is provided for routing a packet. The method includes the step of a data communications device receiving a packet where the packet includes a content request and an Internet Protocol address and port number that identify a source transmitting the packet. Next, the data communications device performs a network address translation, based upon at least a portion of the content request, to translate the Internet Protocol address and port number of the packet to a respective communications device Internet Protocol address and communications device port number. The data communications device then selects a routing policy based upon the communications device Internet Protocol address and routes the packet to a destination based upon the routing policy. This enables application processors within data communications devices, such as the L7 processors, to trigger policy routing.

The step of performing a network address translation based upon at least a portion of the content request can include the step of assigning a policy identifier to the content request based upon at least a portion of the content request where the policy identifier relates to a respective routing policy. The data communications device associates the content request with a corresponding network address translation pool using the policy identifier. The corresponding network address translation pool includes a plurality of communications device Internet Protocol addresses and a plurality of communications device port numbers. The network address translation pool is associated with the routing policy related to the policy identifier. The data communications device then selects a communications device Internet Protocol address number and a communications device port number from the network address translation pool. The data communications device also replaces the source Internet Protocol address of the packet with the communications device Internet Protocol address from the network address translation pool and replaces the source port number of the packet with the communications device port number from the network address translation pool. This is done prior to routing the packet to its destination. Associating a network address translation pool with a routing policy takes advantage of the data communications device's use of network address translation in directing requests to respective destinations.

By performing a network address translation using Internet Protocol addresses chosen from a network address translation pool associated with a routing policy, the data communications device ensures that a request is forwarded to a particular destination using a specific routing policy.

The step of selecting a routing policy based upon the communications device Internet Protocol address can include the steps of converting the communications device Internet Protocol address of the packet into a resultant Internet Protocol address and selecting the routing policy for the content request based upon the resultant Internet Protocol address. The step of converting can include combining the substitute Internet Protocol address from the packet with a masking function to generate a resultant Internet Protocol address. This acts as a data reduction technique to limit the number of addresses within a network address translation pool that the data communications device must track. The step of selecting the routing policy for the content request based upon the resultant Internet Protocol address can include the steps of comparing the resultant Internet Protocol address with Internet Protocol address entries in a lookup table where each Internet Protocol address entry corresponding to a routing policy and selecting a routing policy associated with the Internet Protocol address entry in the lookup table that matches the resultant Internet Protocol address.

When a content request is received by the data communications device, the device can determine if the content request is subject to routing with a routing policy. This allows requests that are not subject to routing using a routing policy to be directly transferred toward a destination. The data communications device can also identify at least a portion of the content request and can parse the content request into content request components, in order to identify potions of the content request. The data communications device can be connected to a routing policy database that provides routing policy information to the communications device.

The data communications device can include a processor portion and a router portion, each having routing policy information. When a packet containing a content request is received by the data communications device, the packet can be forwarded to the processor portion for processing. The packet can then be transferred to the routing portion to send or route the packet to a destination.

In another embodiment, a data communications device includes at least one communications interface, a controller and an interconnection mechanism coupling the at least one communications interface and the controller. The controller is configured to receive a packet, where the packet includes a content request and an Internet Protocol address and port number that identify a source transmitting the packet. The controller is also configured to perform a network address translation, based upon at least a portion of the content request, to translate the Internet Protocol address and port number of the packet to a respective communications device Internet Protocol address and communications device port number. The controller is also configured to select the routing policy based upon the communications device Internet Protocol address and route the packet to a destination based upon the routing policy.

The controller can include a processor portion and a router portion. When a packet is received by the data communications device the packet can be forwarded to the processor portion for processing. The packet can then be forwarded to the routing portion to route or send the packet to a destination.

Another embodiment of the invention relates to a computer program product having a computer-readable medium including computer program logic encoded thereon that, when performed on a computer, causes the computer to receive a packet, the packet comprising a content request and an Internet Protocol address and port number that identify a source transmitting the packet, perform a network address translation, based upon at least a portion of the content request, to translate the Internet Protocol address and port number of the packet to a respective communications device Internet Protocol address and communications device port number, select a routing policy based upon the communications device Internet Protocol address, and route the packet to a destination based upon the routing policy.

It is to be understood that the system of the invention can be embodied strictly as a software program, as software and hardware, or as hardware alone. Is also to be understood that the method for routing a packet of this invention typically performs (e.g., executes, runs, or is otherwise operated) on a data communications device coupled to a data storage or other type of network. In alternative arrangements however, the data communications device of this invention can reside on a computer system located elsewhere on the network.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

The present invention provides techniques that are directed toward selecting a routing policy to direct a content request to a server where the policy chosen is based upon at least a portion of the content request. The method or apparatus associates a portion of a content request with an Internet Protocol (IP) address from a particular network address translation (NAT) pool. Each network address pool is, in turn, associated with a particular routing policy. When the request is directed from the data communications device to the server, using the IP address chosen from the NAT pool, the request is directed using the associated routing policy.

Figure 1A:
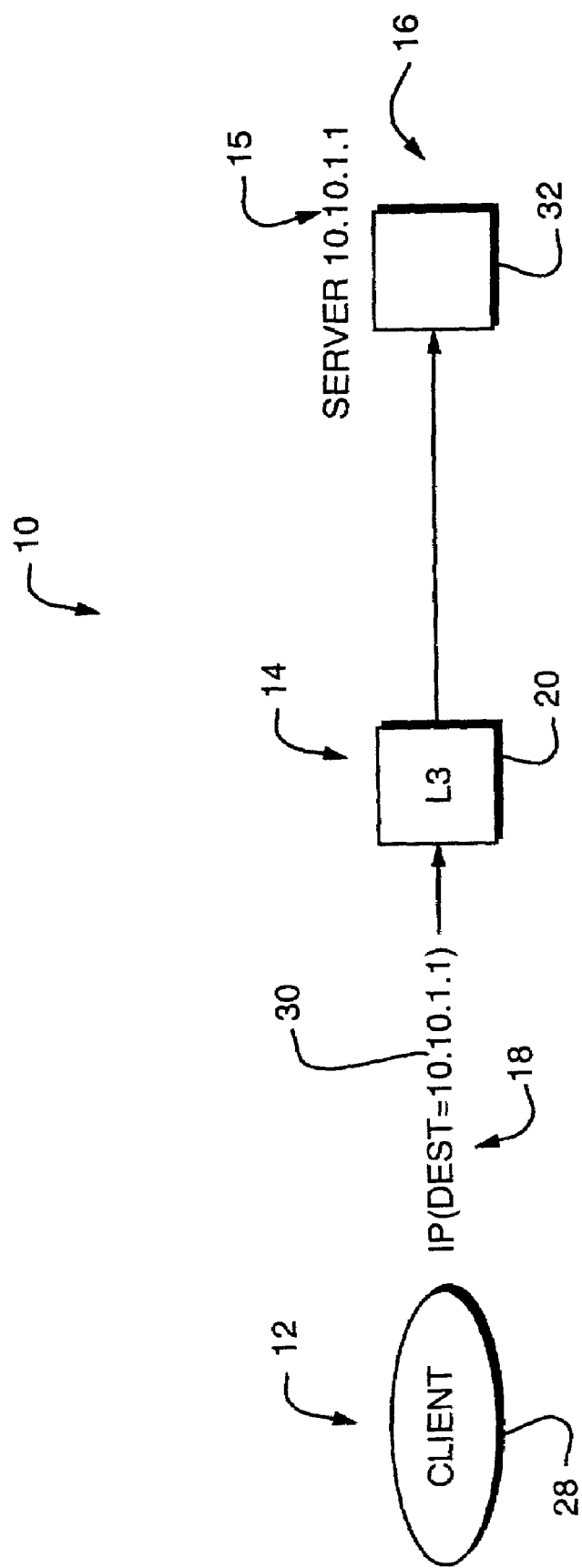
FIGS. 1A and 1B illustrate methods for routing a request from a client to a server.
Figure 1B:
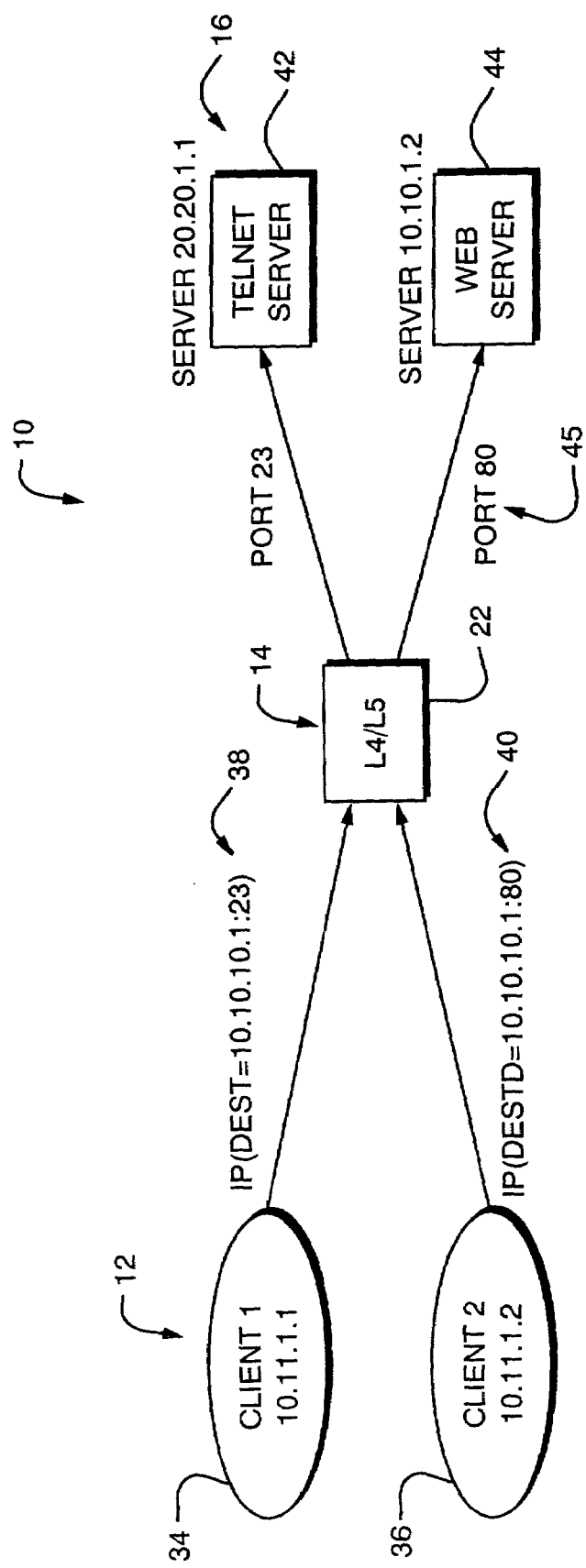
Figure 2:
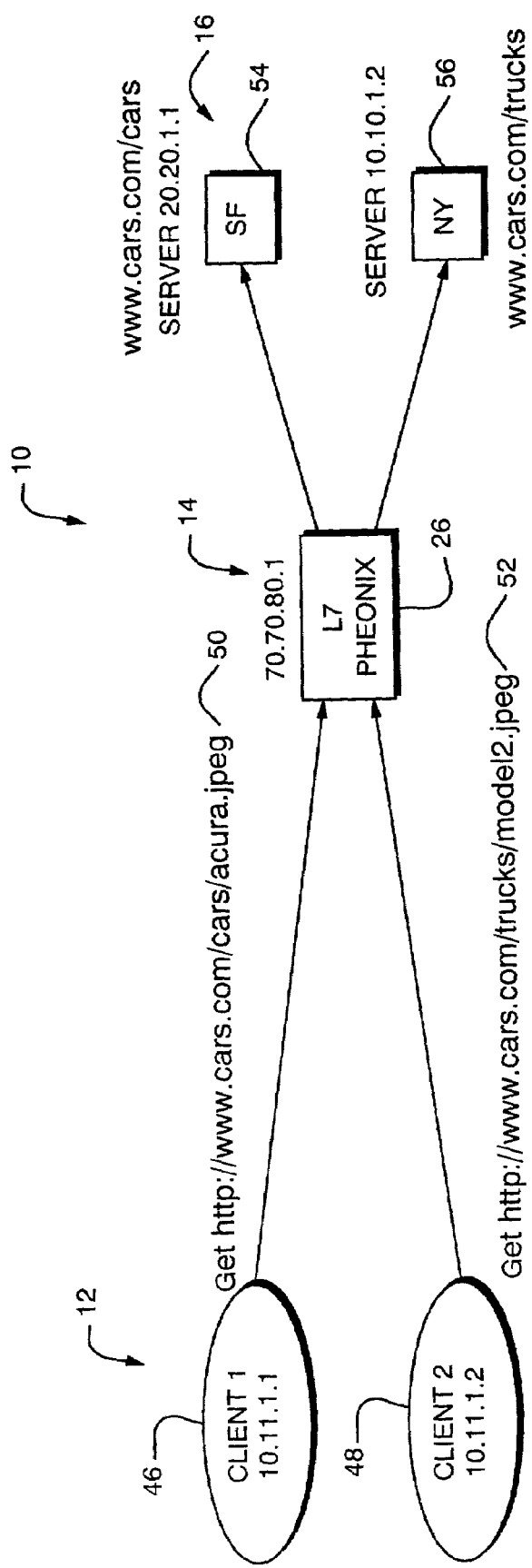
FIG. 2 illustrates a method for routing a content request based upon a content request.
Figure 3:
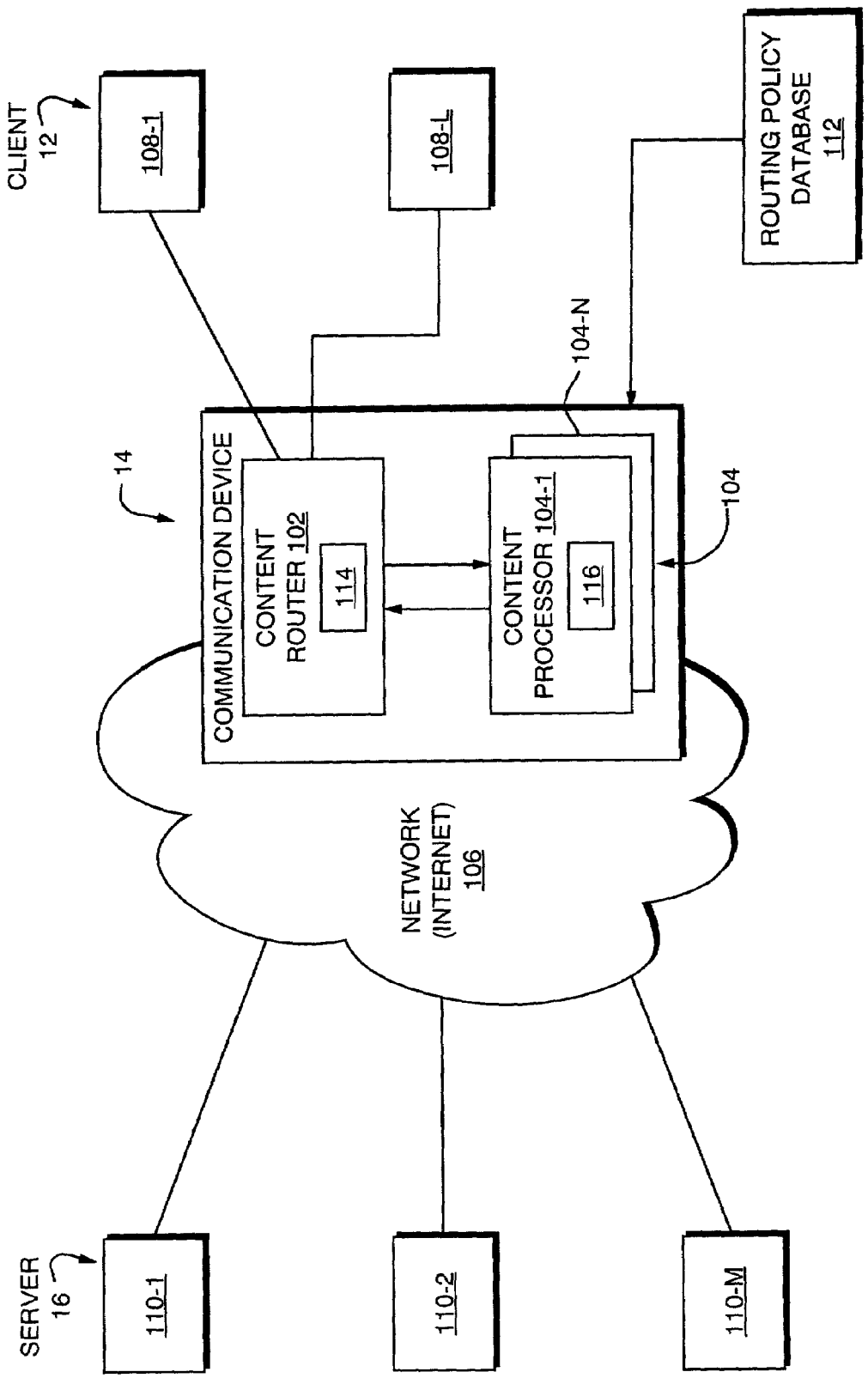
FIG. 3 illustrates an embodiment of a data communications device.

FIG. 3 illustrates an example of a network system 100 including a client 12, a data communications device 14, and a server 16. The client 12 is attached to the data communications device 14, which acts as a point-of-presence on the network system. The server 16 is connected to the communications device 14 by a network 106 that can be a local area network (LAN) or can be the Internet, for example.

The data communications device 14 directs packets from the client 12 to an appropriate server 16, where the packets include a content request, a source IP address of client and a source port number of client. The data communications device includes, but is not limited to, routers, switches, hubs, gateways, network access servers, proxy servers, network bridges, data repeaters, modems, protocols converters, and other types of devices that rely on the correct execution of processes for proper operation, for example. The communications device 14 also can have a content router or router portion 102 and at least one content processor or processor portion 104. The content processor 104 includes a processing function 116 to process content requests. Such processing includes determining an appropriate server 16 to receive the content request, for example. The router portion 102 includes a routing function 114 to direct the request to a destination 16. Each communications device can include more than one content processor. As illustrated, the data communications device 14 includes content processors 104-1 and 104-N.

There is no limit to the number of servers or clients that can be connected to a data communication device. For example, as shown in FIG. 3, multiple clients 12 can be connected to a single data communications device 14, such as clients 108-1 and 108-L. Multiple servers 16 can also be attached to the data communications device 14 by way of a network 106, such as servers 110-1, 110-2, and 110-M.

Routing policy information that indicates how a packet is to be transmitted is, generally, stored external to a data communications device. In one arrangement, the data communications device 14 is connected to a routing policy database 112 that provides routing policy information for content requests. The routing policy information can relate to service, security, the type of transport (isonchronous versus synchronous), or bandwidth for delivery of a packet. The routing policy information can include policies for routing packets on a particular outbound interface of the data communications device. For example, certain router policies call for packets to be routed over an IPSEC tunnel versus a non-IPSEC tunnel. The routing policy database 112 provides routing policy information to both the processor portion 104 and the router portion 102 of the communications device 14.

For a plurality of data communications devices within a network, the routing policy database provides routing policy information to all data communication devices within the network. The use of a routing policy database allows global changes or updates in routing policies to be made in all data communication devices that are connected to, or are in communication with, the routing policy database.

Figure 4:
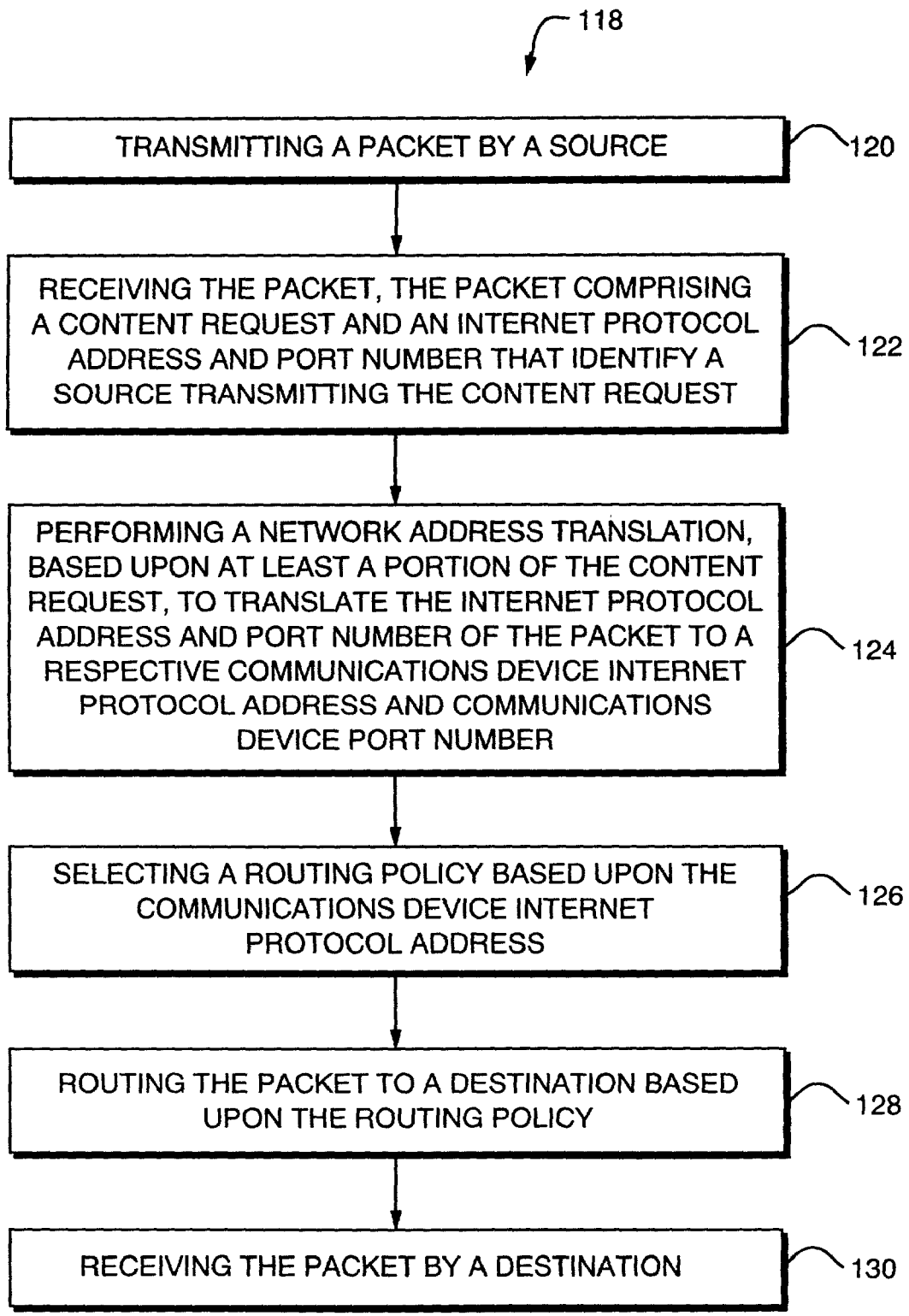
FIG. 4 illustrates a method for routing a packet by a data communications device.

FIG. 4 illustrates an embodiment of a method 118 for routing a packet by a communications device. In step 120, a client or source transmits a packet to a destination. A data communications device located between the client and multiple servers can intercept the packet in order to direct the packet to the appropriate server.

In step 122, the communications device receives the packet. The packet includes a content request along with an IP address and port number that identify the source transmitting the packet. In one arrangement, the data communications device identifies at least a portion of the content request included in the packet. For example, the communications device can parse the content request, or uniform resource locator (URL) located in the packet, into several components, including an application portion or header (HTTP, FTP), a domain name portion (www.cars.com), and an objects or content class portion (/trucks/model2jpeg).

The data communications device determines if the content request is subject to policy based routing. This is performed through the examination, by the data communications device, of the domain name portion of a content request, for example. After the data communications device receives the packet, the device can also make requests to a DNS server to determine the destination server IP address.

Next, in step 124, the data communications device performs a network address translation on the IP address and port number of the packet. The translation converts the IP address and port number located in the packet identifying the source making the content request into a respective communications device IP address and communications device port number.

This network address translation is based on at least portion of content request. The data communications device, in one arrangement, includes a lookup table such that, during a network address translation procedure, a data communications device IP address is chosen from a pool of IP addresses associated with a component of the content request. For example, in the lookup table, a content request element, such as an object portion having a characteristic of *.JPEG, is associated with a network address translation IP address pool having a range between 10.10.10.20 through 10.10.10.40. When a packet containing *.JPEG as part of its content request is received by the data communications device, the device performs a network address translation on the source or client IP address. The device matches the requested object, *.JPEG with the content request element of *.JPEG in lookup table and chooses a communications device IP address from the addresses (10.10.10.20 through 10.10.10.40) in the associated pool.

In step 126, the data communications device selects a routing policy based upon the communications device IP address. The communications device can include a lookup table that includes a series of communications device IP addresses and corresponding routing policies. The data communications device, therefore, selects a routing policy from the lookup table by matching the communications device IP address with an IP address in the lookup table and selecting the corresponding routing policy.

In step 128, the communications device routes the packet to the destination based upon the routing policy. For example, a policy can be set by systems administrator such that all requests having particular communications IP address are routed to a destination according to a particular quality service or along a connection having a particular connection speed. In step 130, a destination, such as a server, receives the packet. The server then executes the content request and forward a response to the request back to the communications device, for further transmission to the client.

Figure 5:
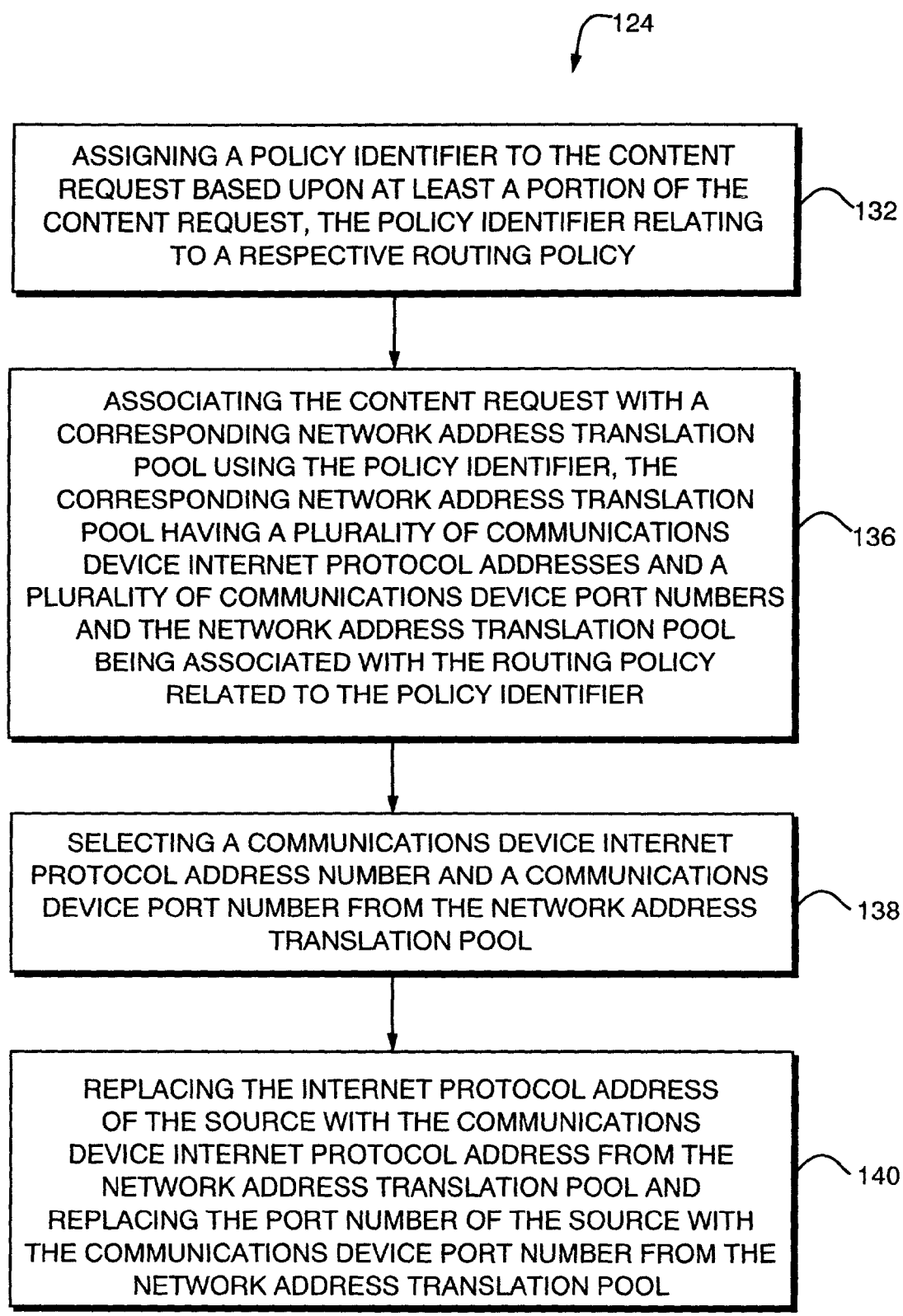
FIG. 5 illustrates the steps involved in performing a network address translation, in one embodiment.

FIG. 5 illustrates an embodiment, given generally as 124, for performing a network address translation on a packet based on at least a portion of the content request. When a client transmits a packet to a destination, the packet includes a source IP address and a source port number. This allows the destination to respond to the request and send the response to the proper location or client. In a process known as spoofing, when a data communications device intercepts a packet or a request from a source, to determine the best server to forward the request, the device replaces the source or client IP address and port number in the packet with an IP address and port number that identifies the communications device as the source of the request. A server's response to the request is then returned to the data communications device.

After a data communications device has received a packet from a client, in step 132, the communications device assigns a policy identifier to the content request based upon at least a portion of the content request. The policy identifier represents a routing policy for a packet and can be a number or a symbol, for example. By assigning a policy identifier to a portion of the content request, the data communications device maps the content request to a particular preset routing policy. The packet containing the content request is later transferred to an appropriate server using the associated routing policy.

Next, in step 136, the policy identifier associates the content request with a corresponding network address translation (NAT) pool. The NAT pool includes a plurality of IP addresses and a plurality of port numbers. Each NAT pool is associated with a corresponding routing policy and is related to the routing policy by the policy identifier. The communications device can include a lookup table having a plurality of policy identifiers and a plurality of NAT pools and can use the table to match the policy identifier associated with the content request with the policy identifier associated with the corresponding NAT pool.

In step 138, the data communications device selects a communications device IP address number and communications device port number from the NAT pool. The selected IP address and port number are unique to the communications device within a network.

In step 140, the IP address of the source, located within the packet, is replaced with the communications device IP address chosen from the NAT pool. The port number identifying the source, located within the packet, is also replaced with the communications device port number chosen from the NAT pool. By associating both a portion of the content request and a NAT pool with a particular routing policy, when a communications device IP address is chosen from the NAT pool and is used to route a packet or request to a destination, the content request is forwarded to the destination according to the associated routing policy. In this method, the communications device can route the packet to a server using a routing policy that is based upon at least portion of the content request.

Figure 6:
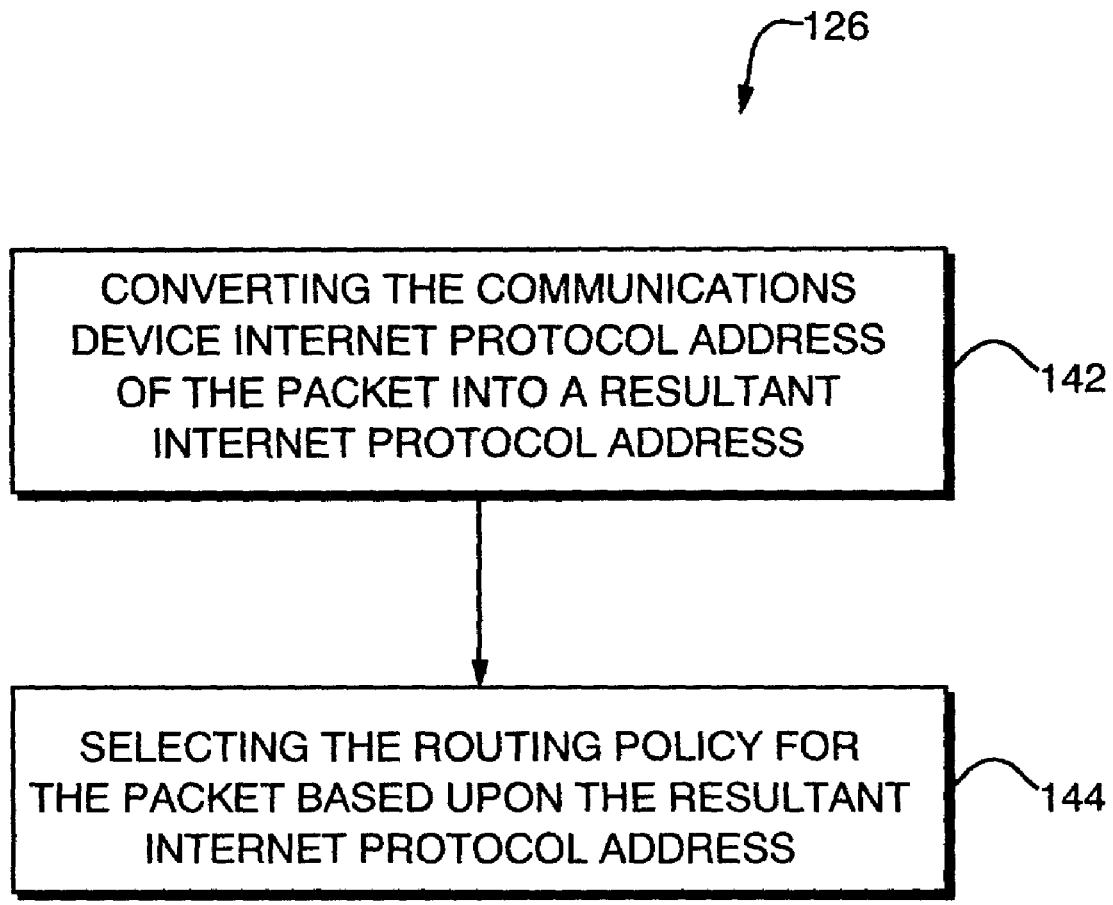
FIG. 6 illustrates a method for selecting a routing policy based on the Internet Protocol address of the communications device in one embodiment.

FIG. 6 illustrates an embodiment of the step of selecting a routing policy based upon a communications device IP address, given generally as 126. The steps in this embodiment can occur after the communications device has selected a data communications IP address from a NAT pool. In step 142, the data communications device converts a communications device IP address, associated with the packet, into a resultant IP address. The data communications device performs this conversion step by combining the communications device IP address from the packet with a function, such as a masking function, to generate a resultant IP address. A description of the masking function is provided below.

Next, in step 144, the communications device selects a routing policy for the packet, based upon the resultant IP address. In one arrangement, the data communications device performs this selecting step by comparing the resultant IP address with IP address entries in a third lookup table where each IP address entry corresponds to routing policy. The communications device selects a routing policy associated with IP address entry in a lookup table that matches the IP address.

Figure 7:
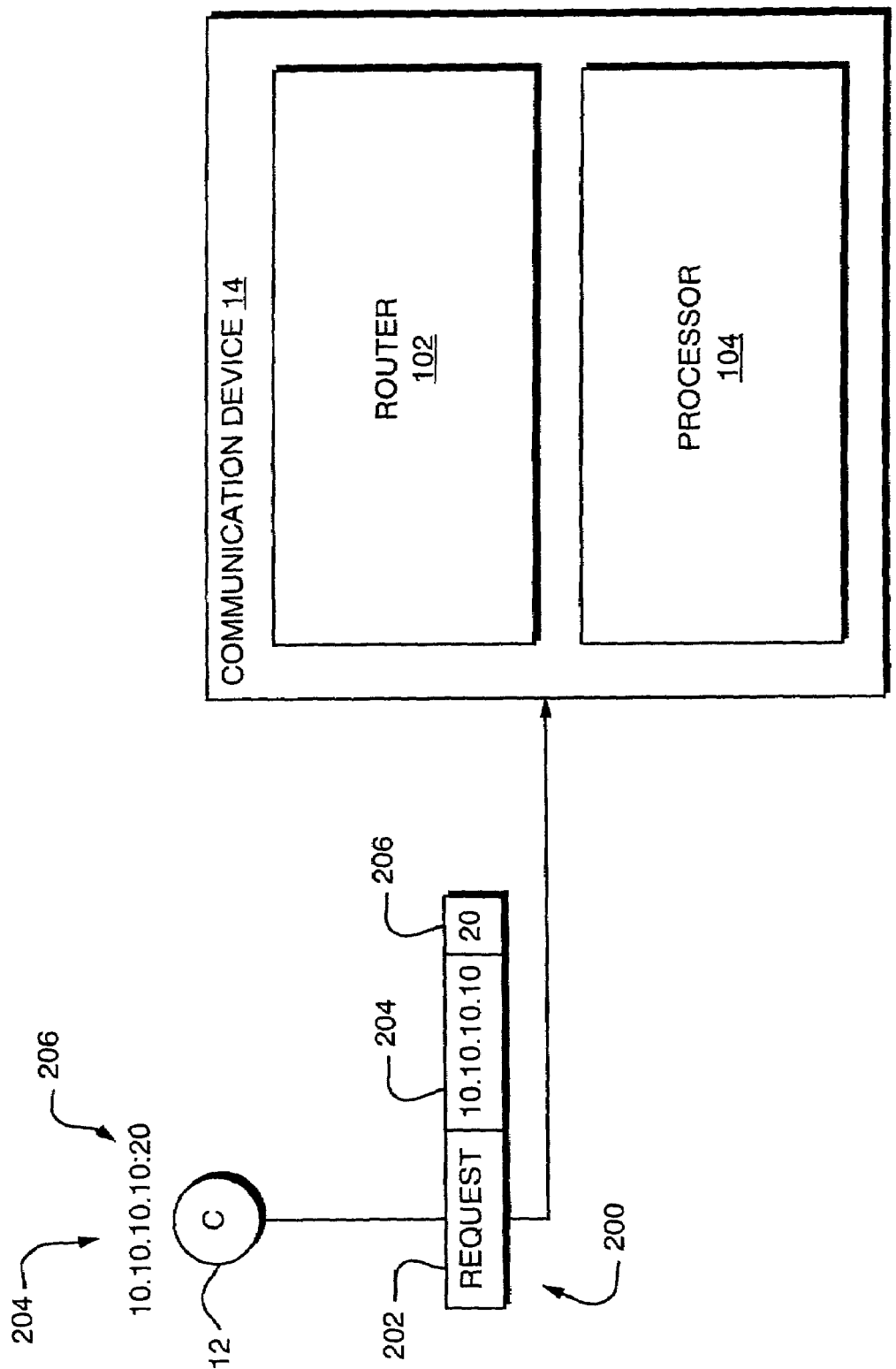
FIG. 7 illustrates a client transmitting a packet in one embodiment.

FIGS. 7 through 12 illustrate an example of the process of selecting a routing policy to direct a packet or content request to a destination. FIG. 7 illustrates a client 12 transmitting a packet 200. The packet 200 includes a content request 202 and an IP address 204 and port number 206 identifying the source of the packet 200. A communications device 14, located between the client 204 and a server, intercepts the packet 200 to determine the appropriate server to receive the packet 200. The packet 200 is directed to a processor portion 104 of the data communications device 14.

Figure 8:
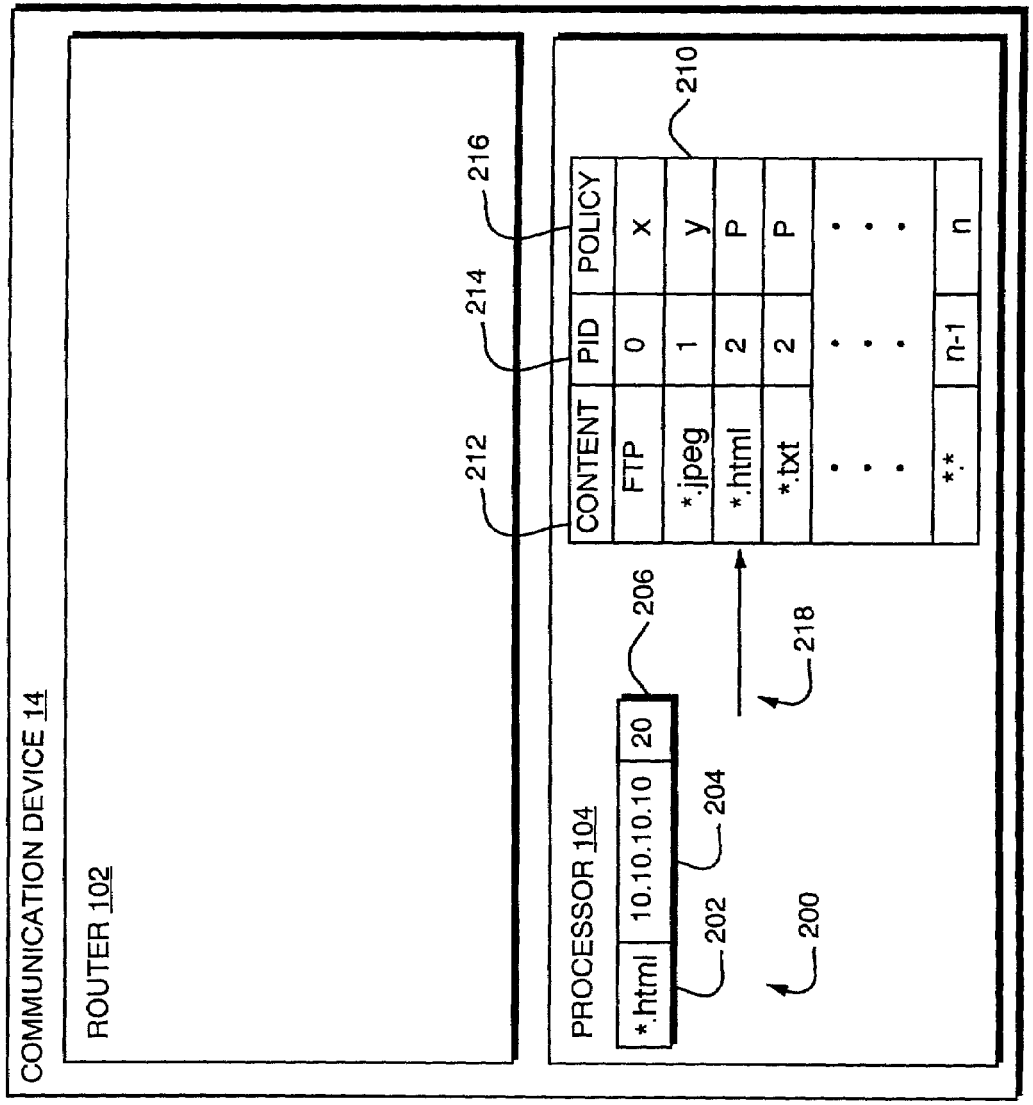
FIG. 8 shows the communications device associating at least portion of a content request to a particular routing policy.
Figure 9:
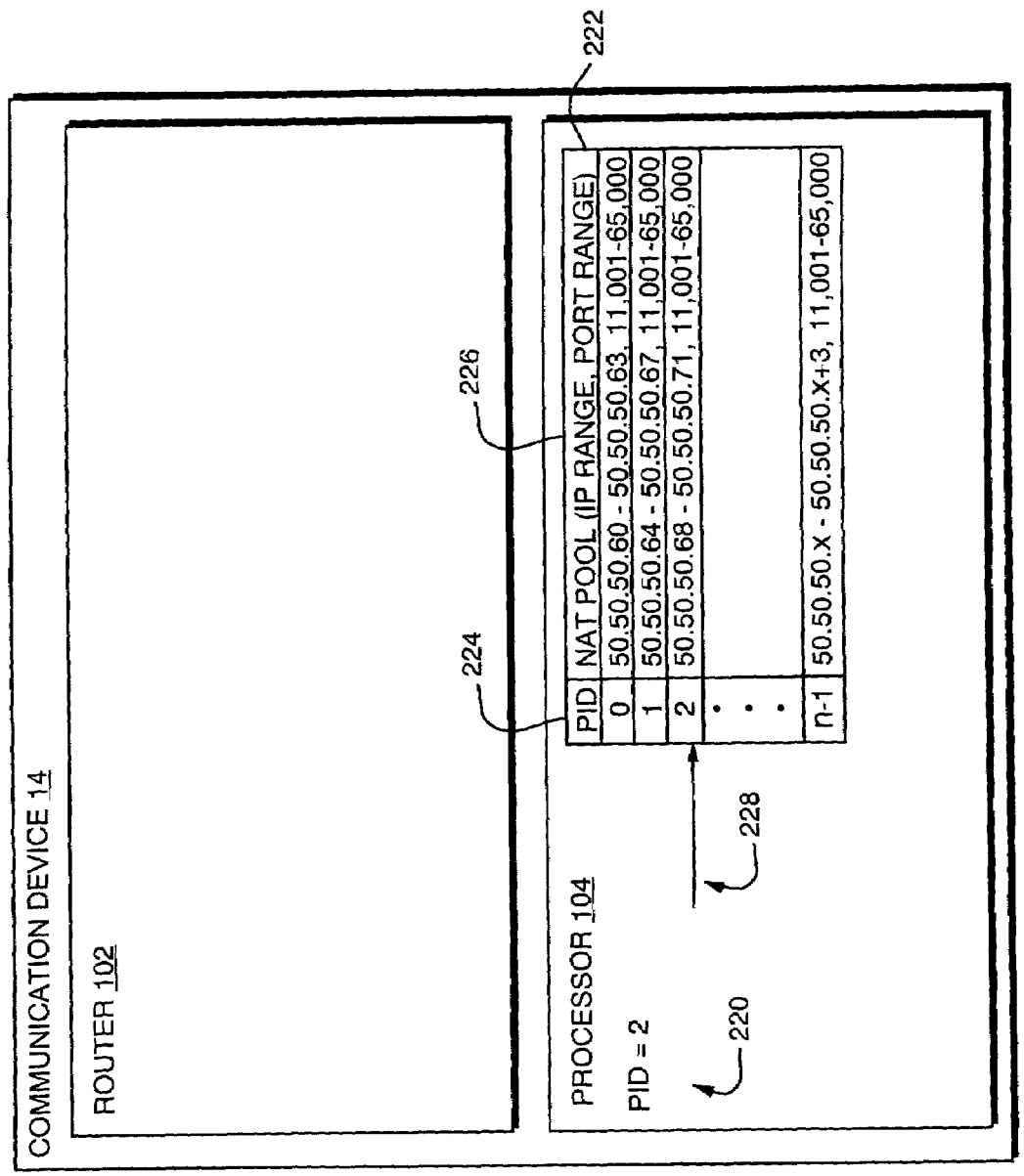
FIG. 9 shows the communications device selecting a communications device Internet Protocol address and communications device port number from a network address translation pool.

The processor 104 examines the content request within the packet and, as is illustrated in FIGS. 8 and 9, associates at least portion of the request to a particular routing policy using network address translation (NAT) techniques. After the processor receives the packet 200, the processor 14 can parse a request 202 into its components to determine the portions of the content request 202. The processor 104 maps at least a portion of the content request 202 to a routing policy using a policy identifier in a first lookup table 210. The first lookup table 210 can include a content request column 212 and a policy identifier column 214 where each element in the policy identifier column 214 represents a corresponding, respective routing policy, illustrated as a routing policy column 216.

The policy identifier or index can include an integer or symbol that represents a transport or routing policy that is independent of the data communications device 14. For a network having a plurality of data communication devices, the policy identifiers are global across the entire network. For example, each policy identifier value is associated with a corresponding routing policy. By using a uniform set of policy identifier values in every data communications device 14 within a network, uniform routing policies are executed within the network for every predetermined content element.

The policy identifier can include values between zero and n−1. When the policy identifier is set to a value of zero, a default routing policy is used to route the packet 200 to a destination. The default policy can be determined by a systems administrator and can include routing a packet according to best efforts protocol, for example. Also, if a particular content request does not have an associated routing policy, the content request is routed according to the default policy, for example.

In one arrangement, different content request elements 202 portions can be associated with a common routing policy using the policy identifier. For example, as shown in the lookup table 210 in FIG. 8, a content request 202 that includes an object class having a *.HTML limitation is associated with a policy identifier=2. This policy identifier maps the content request to a routing policy P. A content request 202 that includes an object class or component having a *.TXT limitation is also associated with a policy identifier=2. Again, this policy identifier maps the content request to a routing policy P.

As shown in FIG. 8, the packet 200 includes a content request 202, a source IP address 204, and a source port number 20. The content request portion 202 of the packet 200 includes an object or content class requesting a *.HTML file within the content request. The processor 104 then maps the content class request 202 to the content class column 212 of the lookup table 210. The processor 104 determines the corresponding policy identifier value (PID) from the policy identifier column 214, where the PID value corresponds to a particular routing policy for the content request. In this example, the *.HTML object is mapped to a policy identifier=2 where the policy identifier corresponds to a routing policy P. This mapping is shown by reference number 218.

FIG. 9 illustrates the processor 104 selecting a communications device IP address and communications device port number from a network address translation (NAT) pool 222, based upon the policy identifier 220 associated with the content request. A NAT pool is formed of a range of IP addresses and a range of port numbers. To ensure that all server responses to a client content request are returned to the data communications device, the source IP address and source port number from the packet are translated into an IP address and port number that identifies the communications device as a source of the request. The translation is performed by the data communications device selecting an IP address and port number from the NAT pool that is unique across a network and substituting the selected IP address and port number for the source IP address and port number within the packet. While the connection is active, a mapping between the IP address from the NAT pool and the source IP address is maintained so that the address translation can be reversed, translating from the IP address from the NAT pool to the source IP address, for response packets. In response to a packet or request forwarded by a data communications device 14, therefore, the destination or server can return the response to the data communications device rather than returning the request directly to the client. Because a NAT pool is required for a data communications device 14 to guarantee that response packets are routed back to the communications device from the server, associating certain IP addresses within the NAT pool with particular routing policies allows a content request to be forwarded to a server according to routing policy associated with the IP addresses selected from the NAT pool.

For example, as illustrated in FIG. 9, the processor 104 includes a second lookup table 222 having a policy identifier column 224 and a NAT pool column 226. Each row within the NAT pool column 226 includes a unique NAT pool that has an IP address range and a port number range. The port number range can be relatively large. For example, the port number within the NAT pool can have a range between 11,001 and 65,000. Because a packet is identified by both its source IP address and port number, the use of substitute or data communications port numbers within a relatively large range prevents the IP address range of the NAT pool from consuming a large number of IP addresses. The IP address range can be minimized within each NAT pool by using port numbers within a relatively large range.

Each policy identifier value within the policy identifier column 224 is associated with a particular IP address range within the NAT pool. During the network address translation process, the processor 104 selects a NAT pool based upon a corresponding policy identifier value. For example, the policy identifier 220 has a value=2. This value is mapped to the NAT pool having an IP address range of 50.50.50.68 through 50.50.50.71 within the lookup table 222. This mapping is given by reference number 228. The processor 104 then chooses and IP address within this range and a port number within the range of 11,001 through 65,000 where the IP address and port number are unused and unique over a network. The IP address and port number chosen from the NAT pool is substituted for the source IP address and source port number within the packet as a communications device IP address and communications device port number. The packet 200 is then transferred by the processor 104 to the router 102 of the communications device 14.

Figure 10:
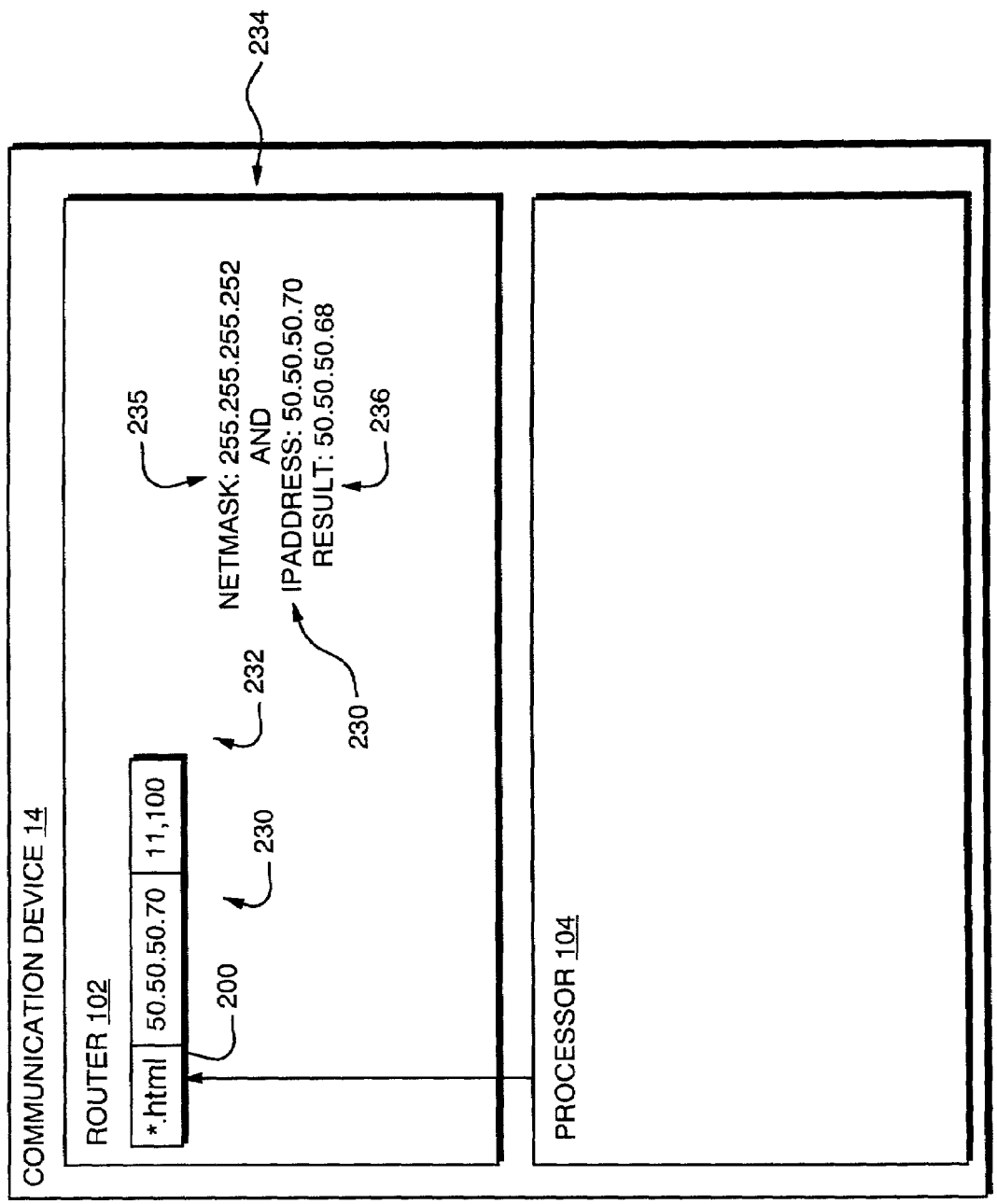
FIG. 10 illustrates the communications device converting the communications device Internet Protocol address into a resulting Internet Protocol address.

FIG. 10 illustrates the data communications device converting the communications device IP address into a resulting IP address. The conversion process is performed by the router 102 and is done as a data reduction step, in order to reduce the number of IP addresses that the router 102 is responsible for tracking. The conversion is performed, in one arrangement, by combining data communications device IP address from the packet 200 with a function to generate a resulting IP address. Preferably the function is a masking or netmasking function, described as follows.

Each NAT pool, as illustrated in FIG. 9, is defined not only by a range of IP addresses but by a netmask. The netmask acts to "mask out" certain portions of an IP address when combined with the IP address. The netmask is defined in both the processor 104, as part of the NAT pool, and in the router 102. Each of the IP addresses within a given NAT pool, when combined with the netmask, yields a single IP address that represents all of the IP addresses within the NAT pool. The resultant IP address is unique across all of the NAT pools.

For example, as is shown in FIG. 10, the netmask has a value of 255.255.255.252. This particular netmask, when combined with an IP address, masks the lowest two bits of the IP address data range. For example, when the IP addresses within the NAT pool having the range of 50.50.50.60 through 50.50.50.63 are combined with the netmask through the process of binary addition, using an AND procedure, the IP address of 50.50.50.60 is returned. When the IP addresses within the NAT pool having the range of 50.50.50.64 through 50.50.50.67 are combined with the netmask through an AND procedure, the IP address of 50.50.50.64 is returned. When the IP addresses within the NAT pool having the range of 50.50.50.68 through 50.50.50.71 are combined with the netmask, the IP address of 50.50.50.68 is returned. While the netmask of 255.255.255.252 masks the lowest two bits of an IP address data range, alternate netmasks can be used to mask the lowest 4, 8, or 16 bits of an IP address data range, for example. The netmasking procedure, therefore, is used to convert any of several different IP addresses within an IP address range into a single resultant IP address that is representative of all addresses within the IP address range.

In FIG. 10, the processor 104 transfers the packet to the router 102. The packet 200 includes the communications device IP address 230 as 50.50.50.70 and the communications device port number 232 as 11,100. These values were selected by the processor 104. In applying the netmasking procedure 234 to the IP address 230, the router combines the netmask 25 of 255.255.255.252 with the IP address 230 of 50.50.50.70 to produce a resultant IP address 236 of 50.50.50.68. This resultant IP address 236 is used to select a routing policy for routing of the packet 200 to a destination.

Figure 11:
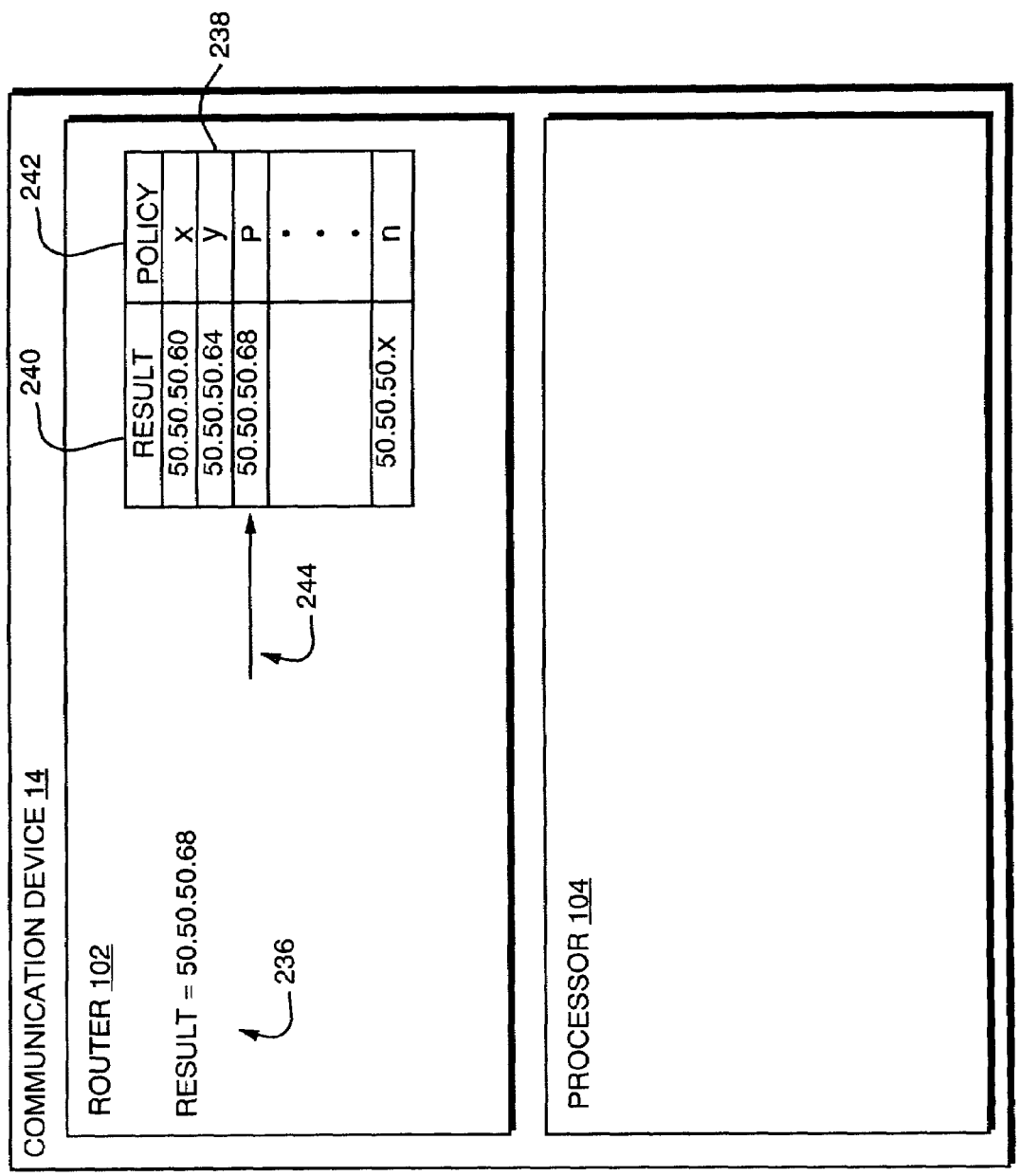
FIG. 11 illustrates the communications device selecting a routing policy for the packet based upon the resulting Internet Protocol address.

FIG. 11 illustrates the communications device selecting a routing policy for the packet based upon the resulting IP address. The router portion 102 includes a lookup table 238 or an access control list (ACL) that includes a resultant IP address column 240 and a routing policy column 242. As shown, the resultant IP address 236 from the netmasking procedure is 50.50.50.68. The router 102 compares the resultant IP address 236 to the entries in the resultant IP address column 240 and determines that the resultant IP address 236 is associated with routing policy P, illustrated by indicator 244. If, for example, there was no match between the resultant IP address and the resultant IP address column 240, access to a destination or server can be either be denied or can be routed according to a default routing policy.

Figure 12:
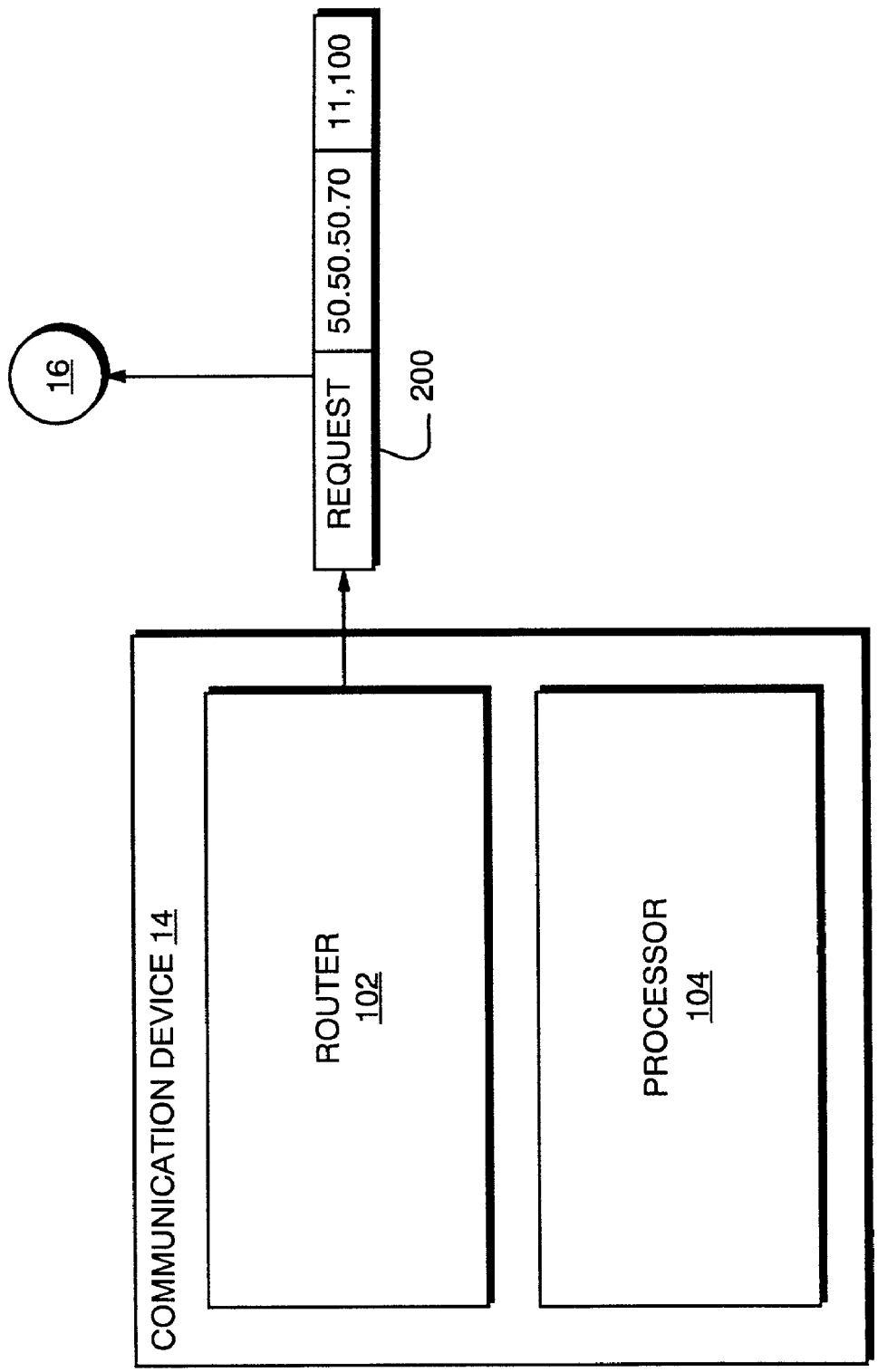
FIG. 12 illustrates the communications device forwarding a packet to a destination.

FIG. 12 illustrates the router 102 forwarding the packet 200 to a destination, such as a server 16. The packet 200 is transmitted to the server 16 according to routing policy P.

This example illustrates associating at least a portion of a content request with a routing policy based upon the use of a network address translation pool and transmitting the request to a destination using the routing policy. Because the process is divided between a processor component 104 and a routing component 102 of the data communications device 14, this example also illustrates the use of a netmasking procedure as a method for data reduction in the router 102.

Figure 13:
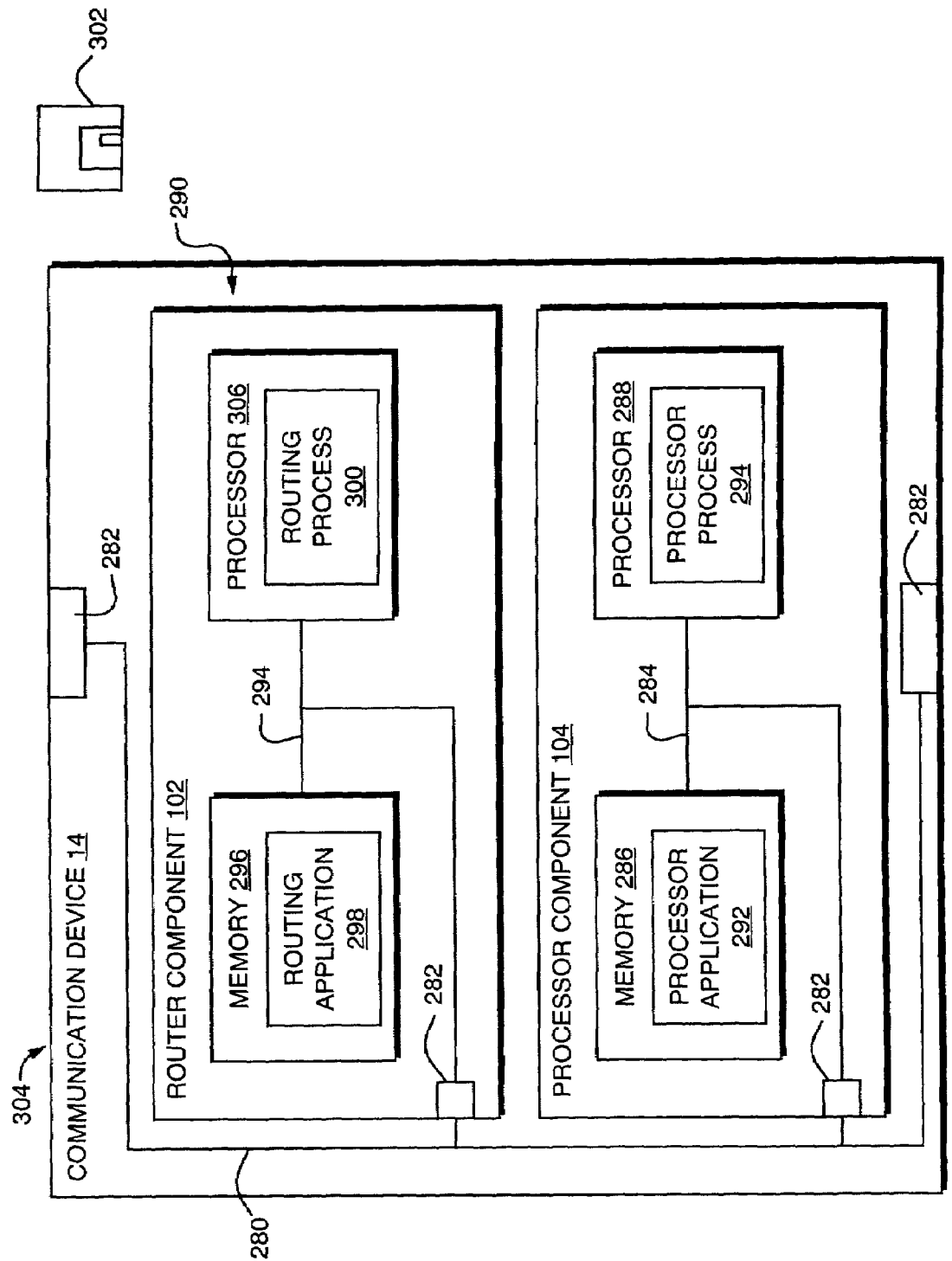
FIG. 13 illustrates an embodiment of a computer device, configured as a communications device.

FIG. 13 illustrates an example of a computer device 104 that is configured to run as a data communications device 14, that implies one embodiment of the invention. The computer device 304 includes a controller 290 that includes a router component 102 and a processor component 104. The computer device 304 also includes an interconnection mechanism 280 such as a data bus or circuitry which interconnects the router component 102, the processor component 104 and one or more communications interfaces 282. A computer program product 302 includes an application or logic instructions that are loaded into the computer device 304 to configure the device 304 to perform as a data communications device 14. The computer program product 302 includes a processor application 292 and a routing application 298.

The processor component 104 includes an interconnection mechanism 284, a memory 286, and a processor 288. The processing function 116 of the processor can include a processor application 292 or a processor process 294. The memory 286 can be of any type of volatile or non-volatile memory or storage system such as a computer memory (e.g., random access memory (RAM), read only memory (ROM), or another type of memory) disk memory, such as hard disk, floppy disk, optical disk, for example. The memory 286 is encoded with logic instructions and/or data that, in one embodiment of the processor component 104, forms the processor application 292 configured according to the embodiments of the invention. In other words, the processor application 292 represents software coding instructions and/or data that reside within the memory or storage 286, or with any computer readable medium. The processor 288 represents any type of circuitry or processing device such as a central processing unit, controller, application specific integrated circuit, or other circuitry that can access the processor application 292 encoded within the memory 286 over the interconnection mechanism 284 in order to run, execute, interpret, operate, or otherwise perform the content distributor application 292 logic instructions. In other words, in another embodiment of the processor component 104, the processor process 294 represents one or more portions of the logic instructions of the processor application 292 while being executed or otherwise performed on, by, or in the processor component 104 within the computer device 304.

The router component 102 includes an interconnection mechanism 294, a memory 296, and a processor 306. The routing function 114 of the router component 102 can include a routing application 298 or a routing process 300. The memory 296 can be of any type of volatile or non-volatile memory or storage system such as a computer memory (e.g., random access memory (RAM), read only memory (ROM), or another type of memory) disk memory, such as hard disk, floppy disk, optical disk, for example. The memory 296 is encoded with logic instructions and/or data that, in one embodiment of the routing component 102, forms the routing application 298 configured according to the embodiments of the invention. In other words, the routing application 298 represents software coding instructions and/or data that reside within the memory or storage 296, or with any computer readable medium. The processor 306 represents any type of circuitry or processing device such as a central processing unit, controller, application specific integrated circuit, or other circuitry that can access the router application 298 encoded within the memory 296 over the interconnection mechanism 294 in order to run, execute, interpret, operate, or otherwise perform the routing application 298 logic instructions. In other words, in another embodiment of the router component 102, the router process 300 represents one or more portions of the logic instructions of the routing application 298 while being executed or otherwise performed on, by, or in the routing component 102 within the computer device 304.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. In a data communications device, a method for routing a packet, the method comprising the steps of:
   receiving a packet, the packet having a content request and an Internet Protocol address and port number that identify a source transmitting the packet;
   performing a network address translation, based upon at least a portion of the content request, to translate the Internet Protocol address and port number of the packet to a respective communications device Internet Protocol address and communications device port number;
   selecting a routing policy based upon the communications device Internet Protocol address; and
   routing the packet to a destination based upon the routing policy;
   wherein the step of selecting comprises the steps of:
      converting the communications device Internet Protocol address of the packet into a resultant internet protocol address, and
      selecting the routing policy for the content request based upon the resultant Internet Protocol address;
   wherein the step of converting comprises combining the substitute Internet Protocol address from the packet with a masking function to generate a resultant Internet Protocol address.

2. The method of claim 1 wherein the step of performing further comprises the steps of:
   assigning a policy identifier to the content request based upon at least a portion of the content request, the policy identifier relating to a respective routing policy;
   associating the content request with a corresponding network address translation pool using the policy identifier, the corresponding network address translation pool having a plurality of communications device Internet Protocol addresses and a plurality of communications device port numbers and the network address translation pool being associated with the routing policy related to the policy identifier;
   selecting a communications device Internet Protocol address number and a communications device port number from the network address translation pool; and
   replacing the source Internet Protocol address of the packet with the communications device Internet Protocol address from the network address translation pool and replacing the source port number of the packet with the communications device port number from the network address translation pool.

3. The method of claim 1 wherein the step of selecting comprises:
   comparing the resultant Internet Protocol address with Internet Protocol address entries in a lookup table, each Internet Protocol address entry corresponding to a routing policy; and
   selecting a routing policy associated with the Internet Protocol address entry in the lookup table that matches the resultant Internet Protocol address.

4. The method of claim 1 further comprising identifying at least a portion of the content request.

5. The method of claim 1 further comprising parsing the content request into content request components.

6. The method of claim 1 further comprising connecting the data communications device to a routing policy database, the routing policy database providing routing policy information to the communications device.

7. The method of claim 1 further comprising determining if the content request is subject to routing with a routing policy.

8. The method of claim 1 wherein the step of receiving further comprises forwarding the packet to a processor portion of the data communications device, the processor portion having routing policy information.

9. The method of claim 1 further comprising forwarding the packet to a routing portion of the data communications device, the routing portion having routing policy information.

10. A data communications device comprising:
    at least one communications interface;
    a controller; and
    an interconnection mechanism coupling the at least one communications interface and the controller;
    wherein the controller is configured to:
    receive a packet, the packet comprising a content request and an Internet Protocol address and port number that identify a source transmitting the packet;
    perform a network address translation, based upon at least a portion of the content request, to translate the Internet Protocol address and port number of the packet to a respective communications device Internet Protocol address and communications device port number;
    select a routing policy based upon the communications device Internet Protocol address; and
    route the packet to a destination based upon the routing policy;
    wherein the controller, when selecting, is configured to:
       convert the communications device Internet Protocol address of the packet into a resultant Internet Protocol address, and
       select the routing policy for the content request based upon the resultant Internet Protocol address;
    wherein the controller, when converting, is configured to combine the substitute Internet Protocol address from the packet with a masking function to generate a resultant Internet Protocol address.

11. The data communications device of claim 10 wherein the controller, when performing the network address translation, is configured to:

assign a policy identifier to the content request based upon at least a portion of the content request, the policy identifier relating to a respective routing policy;

associate the content request with a corresponding network address translation pool using the policy identifier, the corresponding network address translation pool having a plurality of communications device Internet Protocol addresses and a plurality of communications device port numbers and the network address translation pool being associated with the routing policy related to the policy identifier;

select a communications device Internet Protocol address number and a communications device port number from the network address translation pool; and replace the source Internet Protocol address of the packet with the communications device Internet Protocol address from the network address translation pool and replacing the source port number of the packet with the communications device port number from the network address translation pool.

12. The data communications device of claim 10 wherein the controller, when selecting the routing policy, is configured to:

compare the resultant Internet Protocol address with Internet Protocol address entries in a lookup table, each Internet Protocol address entry corresponding to a routing policy; and select a routing policy associated with the Internet Protocol address entry in the lookup table that matches the resultant Internet Protocol address.

13. The data communications device of claim 10 wherein the controller is further configured to perform the operation of identifying at least a portion of the content request.

14. The data communications device of claim 10 wherein the controller is further configured to perform the operation of parsing the content request into content request components.

15. The data communications device of claim 10 wherein the controller is further configured to perform the operation of connecting the data communications device to a routing policy database, the routing policy database providing routing policy information to the communications device.

16. The data communications device of claim 10 wherein the controller is further configured to perform the operation of determining if the content request is subject to routing with a routing policy.

17. The data communications device of claim 10 wherein the controller, when receiving a packet, is further configured to forward the packet to a processor portion of the data communications device, the processor portion having routing policy information.

18. The data communications device of claim 10 wherein the controller is further configured to perform the operation of forwarding the content request to a routing portion of the data communications device, the routing portion having routing policy information.

19. A computer program product having a computer-readable medium including computer program logic stored thereon that, when performed on a computer, causes the computer to:

receive a packet, the packet comprising a content request and an Internet Protocol address and port number that identify a source transmitting the packet;

perform a network address translation, based upon at least a portion of the content request, to translate the Internet Protocol address and port number of the packet to a respective communications device Internet Protocol address and communications device port number;

select a routing policy based upon the communications device Internet Protocol address;

route the packet to a destination based upon the routing policy;

when selecting:
convert the communications device Internet Protocol address of the packet into a resultant Internet Protocol address, and select the routine policy for the content request based upon the resultant Internet Protocol address; and when converting, combine the substitute Internet Protocol address from the packet with a masking function to generate a resultant Internet Protocol address.

20. A data communications device comprising:
at least one communications interface;
a controller; and
an interconnection mechanism coupling the at least one communications interface and controller;
wherein the controller includes:
means for receiving a packet, the packet comprising a content request and an Internet Protocol address and port number that identify a source transmitting the packet, means for performing a network address translation, based upon at least a portion of the content request, to translate the Internet Protocol address and port number of the packet to a respective communications device Internet Protocol address and communications device port number, means for selecting a routing policy based upon the communications device Internet Protocol address, means for routing the packet to a destination based upon the routing policy, wherein means for selecting comprises:
means for converting the communications device Internet Protocol address of the packet into a resultant Internet Protocol address, and means for selecting the routing policy for the content request based upon the resultant Internet Protocol address; and wherein means for converting comprises means for combining the substitute Internet Protocol address from the packet with a masking function to generate a resultant Internet Protocol address.

21. The method of claim 1, wherein:
routing the packet to the destination based upon the routing policy comprises routing the packet to the destination based upon the routing policy, the routing policy selected from the group consisting of a service for delivery of the packet, a security level for delivery of the packet, a type of transport for delivery of the packet, and a bandwidth for delivery of the packet.

22. In a data communications device, a method for routing a packet, the method comprising the steps of:

receiving a packet, the packet having a content request and an Internet Protocol address and port number that identify a source transmitting the packet;

determining if the content request is subject to routing with a routing policy performing a network address translation, based upon at least a portion of the content request, to translate the Internet Protocol address and port number of the packet to a respective communications device Internet Protocol address and communications device port number;

selecting the routing policy based upon the communications device Internet Protocol address; and routing the packet to a destination based upon the routing policy.

23. A data communications device comprising:

at least one communications interface;

a controller; and an interconnection mechanism coupling the at least one communications interface and the controller;

wherein the controller is configured to:

receive a packet, the packet comprising a content request and an Internet Protocol address and port number that identify a source transmitting the packet;

determine if the content request is subject to routing with a routing policy;

perform a network address translation, based upon at least a portion of the content request, to translate the Internet Protocol address and port number of the packet to a respective communications device Internet Protocol address and communications device port number;

select the routing policy based upon the communications device Internet Protocol address; and route the packet to a destination based upon the routing policy.

* * * * *